2,896,841

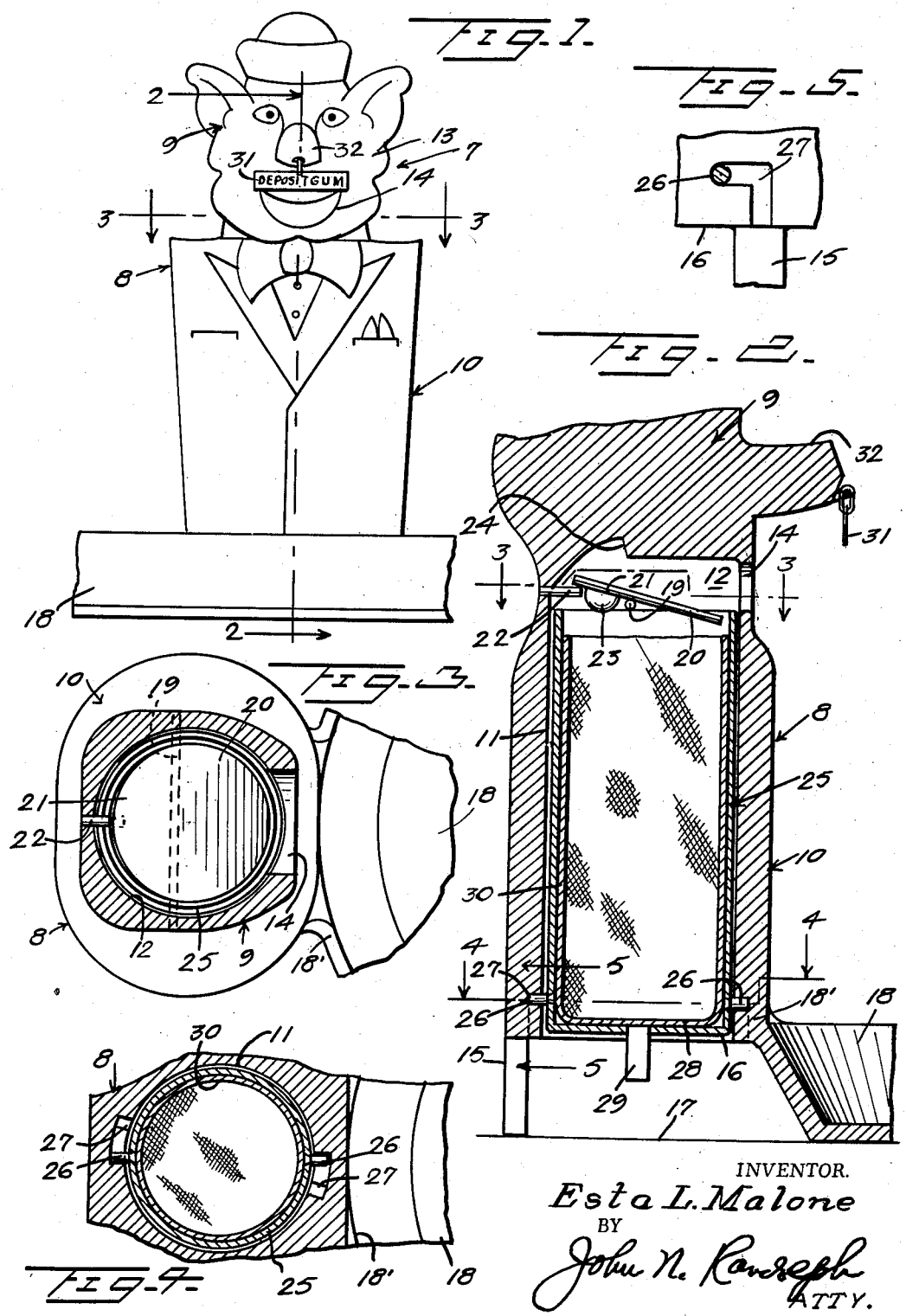

CHEWING GUM DEPOSITORY

Esta L. Malone, Seminole, Okla.

Application January 3, 1958, Serial No. 707,023

3 Claims. (Cl. 232—43.2)

This invention relates to a novel receptacle primarily adapted for use in public places such as restaurants to provide a readily accessible container in which used chewing gum can be conveniently deposited to eliminate or discourage the unsanitary and unattractive habit of sticking used chewing gum on the undersides of tables and chairs or placing such items in ash receptacles.

Another object of the invention is to provide a depository including a closure which will normally close and substantially seal the depository and which can be readily opened by contact of a piece of used chewing gum therewith to allow the chewing gum to be deposited in the receptacle.

A further object of the invention is to provide a receptacle having a removable section to receive the chewing gum and which is provided with a disposable liner in which the used chewing gum is collected and which can be readily removed and disposed of so that the used chewing gum does not have to be touched in cleaning the receptacle.

Still a further object of the invention is to provide a receptacle which will be ornamental in appearance as well as functional so as to attract attention and encourage use of the receptacle.

Still a further object of the invention is to provide a chewing gum depository which readily adapts itself for association with an ash receptacle of the type conventionally provided on restaurant tables.

Various other objects and advantages of the invention will hereinafter become more fully apparent from the following description of the drawing, illustrating a presently preferred embodiment thereof, and wherein:

Figure 1 is a front elevational view of the chewing gum depository and showing a portion of an ash tray associated therewith;

Figure 2 is an enlarged vertical sectional view, taken substantially along a plane as indicated by the line 2—2 of Figure 1;

Figure 3 is an enlarged horizontal sectional view, taken substantially along a plane as indicated by the line 3—3 of Figures 1 and 2;

Figure 4 is a cross sectional view through a lower portion of the receptacle, taken substantially along a plane as indicated by the line 4—4 of Figure 2, and Figure 5 is an enlarged fragmentary vertical sectional view, taken substantially along a plane as indicated by the line 5—5 of Figure 4.

Referring more specifically to the drawing, the chewing gum depository in its entirety is designated generally 7 and includes an elongated substantially upright housing 8 the exterior of which may be suitably shaped into any desired ornamental form, as for example, as illustrated, to simulate the head 9 and bust 10 of a fanciful pig. The bust portion 10 of the housing 8 is hollow, as seen in Figure 2, to provide a large elongated chamber 11 having an open lower end and an upper end 12 formed in the lower portion of the head 9. The remainder of the head 9 may be solid. The front or face 13 of the head 9 is provided with a relatively large opening 14 simulating a mouth and which opens into the upper end 12 of the chamber and constitutes the inlet of the depository 7. The back portion of the lower end of the housing 8 is preferably provided with an extension 15 projecting below the open lower end 16 of the chamber 11 and which extension forms a supporting leg adapted to rest upon a supporting surface 17, such as a table-top. The front part of the lower end of the housing 8 is preferably suitably secured to a rim portion 18' of a small ash tray 18, of the type which rests upon a table, and which combines with the leg 15 in supporting the depository 7 in an upright position.

The ends of a shaft 19 are journaled in lower portions of the head 9 and said shaft extends transversely across the upper portion 12 of the chamber. A plate 20 is fixed to the shaft 19 and is supported thereby for rocking movement within the chamber 11. As seen in Figure 2, a longer portion of the plate 20 extends at an incline from the shaft 19 generally toward the opening 14 and terminates therebeneath. The other smaller part of the plate 20 is inclined upwardly from the shaft 19 in a direction away from the opening 14 and said rear portion 21 normally rests upon a pin 22 which is fixed to the housing 8 and extends into the chamber portion 12. The underside of the rear plate portion 21 is preferably provided with a weight 23 for maintaining the plate 20 in its position of Figure 2 resting upon the stop 22. The chamber 11 includes a surface 24 formed in the upper part thereof and constituting a stop to be engaged by the rear plate portion 21 when the forward portion of the plate is swung downwardly to limit rocking movement of the plate 20 away from the stop 22 and so that the plate will be returned by gravity back to its position of Figure 2 in engagement with the stop 22. It will thus be seen that the plate 20 is normally so disposed within the chamber portion 12 and behind the opening 14 as to have the appearance of a tongue disposed behind the mouth opening 14.

An open top container 25 is properly sized and shaped to fit detachably in the chamber 11 and is adapted to be applied and removed by a sliding and turning movement. The container 25 has studs 26 projecting outwardly from its side wall near the bottom thereof and which are adapted to detachably engage in bayonet grooves 27 formed in the inner side of the wall of the lower portion of the housing part 10 and which open through the lower end thereof. The bottom 28 of the container 25 has a handle 29 fixed to the underside thereof. A bag 30, which is preferably formed of paper, constitutes a disposable liner for the container 25 and is mounted therein so that the open upper end of the bag or liner 30 is disposed beneath and adjacent the open upper end of the container 25.

The open upper end of the container 25 is disposed immediately beneath the level of the inlet opening or mouth 14 and the downwardly inclined forward end of the teeter plate or tongue 20 extends into the open top of the container 25. Assuming that the parts are assembled as seen in Figures 2 and 4, a piece of used chewing gum may be inserted through the mouth or inlet opening 14 onto the forward part of the plate or tongue 20 to cause said forward part of the plate 20 to swing downwardly and rearwardly so that the chewing gum can pass by gravity therefrom into the disposable bag or liner 30, after which the weight 23 will return the plate 20 to its position as illustrated. If desired, the upper side of the plate 20 can be colored to simulate a tongue. When the bag 30 has become substantially filled the depository 7 can be elevated so that the handle 29 can be grasped for turning the container 25 sufficiently to move the studs 26 into alignment with the longitudinally disposed ends of the grooves 27 so that the container 25 can be slidably removed from the housing 8 with the bag 30 therein. The bag 30 can then be removed from the open top of the container 25 and disposed of with its contents and replaced by a fresh bag or liner 30. The previously described procedure can then be reversed to replace the container 25 in the housing 8 by a sliding and then a slight turning movement to engage the bayonet connection 26, 27.

If desired, a sign bearing a legend such as "Deposit Gum" may be suspended from a projection of the face 13 simulating a nose and so that the sign will be disposed above and outwardly with respect to the mouth or inlet opening 14. The sign is shown in Figures 1 and 2 and is designated 31, being suspended from the nose projection 32.

Various modifications and changes are contemplated and may be resorted to, without departing from the function or scope of the invention as hereinafter defined by the appended claims.

I claim as my invention:

1. A chewing gum depository comprising an elongated upright housing having a chamber extending longitudinally thereof and opening through the lower end of the housing and having a closed upper end, a container having an open top, said container being detachably mounted in the housing chamber through the open bottom thereof, said housing having a front portion provided with an inlet opening communicating with the upper end of the chamber above the open upper end of said container, a teeter plate, means mounting the teeter plate for vertical rocking movement in the upper portion of said chamber about a horizontal pivot axis, said teeter plate being disposed at an incline downwardly and forwardly and having a lower forward end normally disposed in a closed position adjacent a portion of the open top of the container and beneath and adjacent said inlet opening, and in close proximity to the closed upper end of the chamber, and means associated with the plate and housing and limiting rocking movement to the teeter plate and normally returning the teeter plate to the closed position thereof, said forward end of the teeter plate being swingable downwardly and rearwardly into the container and into an open position of the teeter plate.

2. A chewing gum depository as in claim 1, said means for limiting rocking movement of the teeter plate including spaced stops supported by the housing and disposed in the path of swinging movement of the rear edge portion of the plate, and a weight supported by the plate between said rear edge portion and the pivot axis of the plate for normally holding the plate against one of said stops to normally maintain the forward end of the plate in an elevated and closed position.

3. A chewing gum depository as in claim 2, said pivot axis of the teeter plate being located more remote from the forward end of the teeter plate than from the rear edge portion thereof.

References Cited in the file of this patent

UNITED STATES PATENTS

| 529,383 | Harvey | Nov. 20, 1894 |
| 929,216 | Hawley | July 27, 1909 |
| 1,660,771 | Stevenson | Feb. 28, 1928 |
| 1,805,422 | Smith | May 12, 1931 |
| 2,382,092 | Onos | Aug. 14, 1945 |
| 2,757,859 | Holland | Aug. 7, 1956 |